United States Patent
Radulescu

(10) Patent No.: US 8,467,313 B1
(45) Date of Patent: Jun. 18, 2013

(54) PHY BANDWIDTH ESTIMATION FROM BACKPRESSURE PATTERNS

(71) Applicant: LSI Corporation, San Jose, CA (US)

(72) Inventor: Codrut Radu Radulescu, Bridgewater, NJ (US)

( * ) Notice: Subject to any disclaimer, the term of this patent is extended or adjusted under 35 U.S.C. 154(b) by 0 days.

(21) Appl. No.: 13/781,011

(22) Filed: Feb. 28, 2013

Related U.S. Application Data

(63) Continuation of application No. 11/857,850, filed on Sep. 19, 2007, now abandoned.

(51) Int. Cl.
*G01R 31/08* (2006.01)
*H04L 12/42* (2006.01)

(52) U.S. Cl.
USPC .......................................... 370/252; 370/449

(58) Field of Classification Search
USPC .................................. 370/252, 449
See application file for complete search history.

(56) References Cited

U.S. PATENT DOCUMENTS

| | | | |
|---|---|---|---|
| 5,586,056 A * | 12/1996 | Watanabe | 340/9.1 |
| 6,011,799 A * | 1/2000 | Kerstein et al. | 370/422 |
| 6,654,957 B1 * | 11/2003 | Moore et al. | 725/111 |
| 7,180,906 B1 * | 2/2007 | Dwork | 370/449 |
| 7,324,501 B1 * | 1/2008 | Hann | 370/352 |
| 7,643,504 B2 * | 1/2010 | Hadas et al. | 370/412 |
| 2009/0073889 A1 * | 3/2009 | Radulescu | 370/252 |

* cited by examiner

*Primary Examiner* — Mark Rinehart
*Assistant Examiner* — Gbemileke Onamuti
(74) *Attorney, Agent, or Firm* — Ryan, Mason & Lewis, LLP

(57) ABSTRACT

The present invention provides a system and method of determining available bandwidth at a physical layer (PHY) device at a server on a broadband network. A link layer controller of a master administrator adaptively polls a PHY device over a set of time intervals. During polling, the controller places a PHY device's address on a line of a bus and awaits a response from the PHY device. Based upon the response from the PHY device, the administrator can determine whether the PHY device has available bandwidth. The link layer controller uses this information to recalculate its polling scheme to better make use of the available bandwidth over the shared transmission medium to which each PHY device in the network is attached.

22 Claims, 4 Drawing Sheets

PHY BANDWIDTH ESTIMATION FROM BACKPRESSURE PATTERNS

FIELD OF THE INVENTION

The invention relates to physical (PHY) device monitoring, and particularly to monitoring bandwidth in PHY devices.

BACKGROUND OF THE INVENTION

As computer network related technology has become faster and cheaper, higher performance computer networks have spread rapidly. One common example of a high performance computer network is a broadband network distributed amongst a grouping of consumers used for Internet access. One typical type of a broadband network is a cable-based Internet provider, such as those provided by television cable companies. Cable networks provide affordable, high speed Internet to anyone hardwired to a cable television network. Another typical broadband network is a Digital Subscriber Line (DSL) network, such as those provided by telephone providers. Similar to a cable network, a DSL network utilizes existing phone lines to offer a high speed alternative to dial-up Internet access. A third, newer type of broadband network is a wireless broadband network such as those provided by wireless telephone companies. A user accesses these networks by integrating a wireless broadband network card into their computer for receiving broadband network signals.

While broadband networks provide many benefits to users, such as the aforementioned high speed and low cost, several drawbacks are common. One such drawback is that on a typical broadband network, all consumer or end user devices are connected to a master administrator via a physical layer (PHY) device at the master administrator. For example, on a typical cable network, each customer is connected to a master administrator by a PHY device. Essentially, each PHY device functions as a port used for accessing the network by a client device. Each PHY device is connected to control circuitry of the master administrator via a shared bus. Any information sent to an individual PHY device is sent along this shared bus. If a target PHY device has low or no bandwidth available when a message is sent, then the message cannot be received and must be resent, effectively wasting buss time as no other PHY device can communicate while the bus is sending a message to another PHY device.

One solution to monitoring the bandwidth at each PHY device is a technique involving constant monitoring of the available bandwidth at each PHY device such that no transmissions are sent to a PHY device that is currently unable to receive data. This is done by a master administrator that constantly polls (or sends signals to a device and monitors the device's response) all PHY devices. However, this is resource and time consuming at the master administrator as the master administrator is generally required to constantly poll PHY devices. This technique also wastes bandwidth on the bus as polling each device requires additional time utilizing the bus. While overall this technique achieves the desired goal of monitoring the bandwidth of each available device, the technique necessitates an inefficient use of resources available in the master administrator.

What is needed is a technique that utilizes dynamic polling monitored and refined over a period of time such that the typical available bandwidth of a PHY device can be monitored and utilized to create a schedule. This schedule can be used for transmitting data to a PHY device at times when the device is highly likely to be able to receive a transmission.

SUMMARY OF THE INVENTION

The present invention provides a system and method of determining available bandwidth at a physical layer (PHY) device on a broadband network. A link layer controller of a master administrator adaptively polls a PHY device over a set of time intervals. During polling, the controller places a PHY device's address on a line of a bus and awaits a response from the PHY device. Based upon the response from the PHY device, the administrator can determine whether the PHY device has available bandwidth. The link layer controller uses this information to recalculate its polling scheme to better make use of the available bandwidth over the shared transmission medium to which each PHY device in the network is attached.

In one embodiment of the present invention, a link layer controller of a master administrator polls a first PHY device. During polling, the link layer controller places the address of a first PHY device a line of the bus, and the PHY device responds with an indication of whether its incoming packet buffer is full. Upon receiving a positive notification (ready to transfer data), the network administration server ceases further polling the device and initiates a data transfer. After a period of time, the network administration server will again begin polling the first PHY device again. As before, the address of the PHY device is sent to the device and an indication is received indicating the current state of the PHY device's incoming packet buffer. The link layer controller repeats the polling of the device until the PHY device responds with an indication that the incoming packet buffer of the PHY device is ready to accept a new data packet. After several repetitions of these steps, the most efficient polling schedule for that device can be determined, one which maximizes the use of the available bandwidth at the PHY device without overfilling the PHY internal buffer, or allowing the incoming packet buffer to sit empty. This would consist of only one polling indicating the buffer ready status and eventually an immediately preceding polling that would indicate the unavailability of the buffer. This way the accurate moment in time the buffer crosses the threshold ca be determined and also the PHY bandwidth can be extracted.

By extending this polling scheme to each PHY device on the bus, the link layer controller can accurately determine the available bandwidth at each PHY device and create a schedule for transmitting data to each PHY device that most efficiently utilizes the bandwidth of the shared transmission medium each PHY device communicates with the link layer controller on.

DETAILED DESCRIPTION

The present invention provides a method and system for monitoring available bandwidth at physical layer (PHY)

devices in a master administrator for a broadband network. By adaptively polling the devices at specific time intervals, a more efficient monitoring procedure can be created for an individual PHY device that better utilizes available resources than previous polling procedures. Adaptively polling refers to a polling schedule that can be dynamically altered. If, for example, a device is found to be sitting idle for long periods of time, its polling schedule will be altered to eliminate these periods of idleness.

Figure 1:
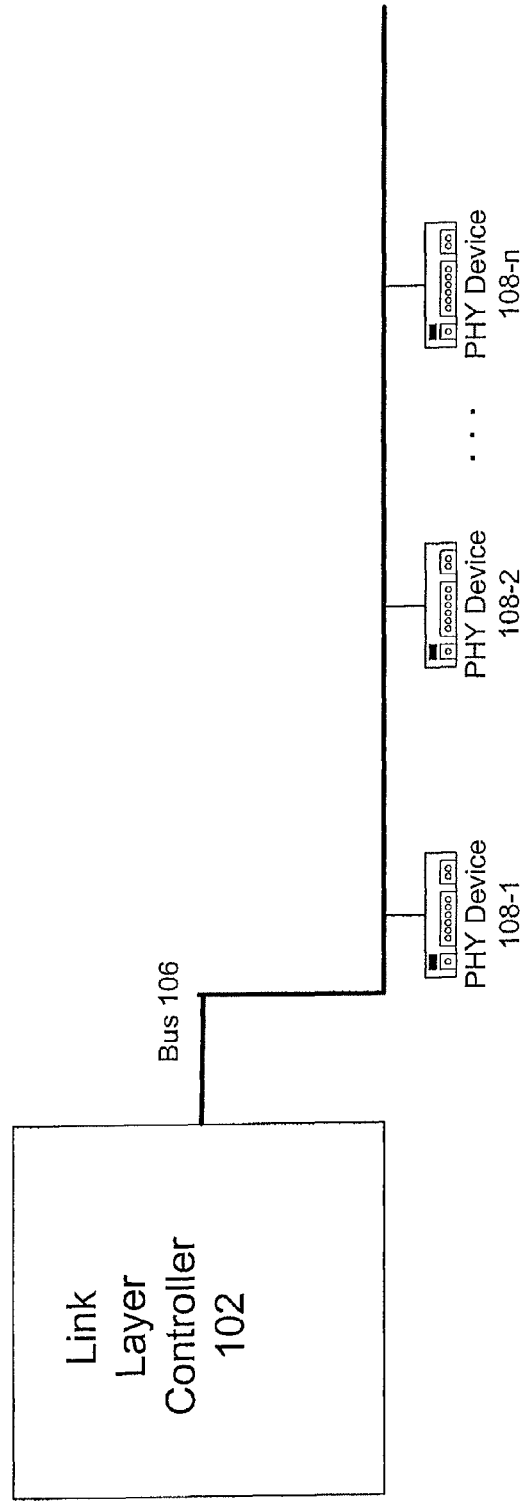
FIG. 1 is a diagram of a master administrator.

FIG. 1 illustrates a diagram of a typical master administrator 100. Link layer controller 102 communicates with a series of PHY devices. These PHY devices are used by broadband service clients to access the Internet, send and receive email, utilize voice over IP telephone service, etc. PHY devices 108-1, 108-2, through 108-n are all operably connected to link layer 102, and through bus 106. PHY devices are the actual physical layer connections used by a client to access the available network resources. Each PHY device has an incoming packet buffer which is used to store incoming packets from a client computer until the packets can be processed. By monitoring the incoming packet buffer full level of a PHY device, the master administrator can accurately predict what the available bandwidth at each PHY device will be. However, to accurately predict the available bandwidth, the link layer controller must poll the PHY devices over bus 106. However, shared busses, such as bus 106, include inherent scheduling issues. Only one device can be polled at a time. By carefully scheduling the polling of each PHY device, the efficiency of the shared bus, in this case Bus 106, can be increased.

Figure 2:
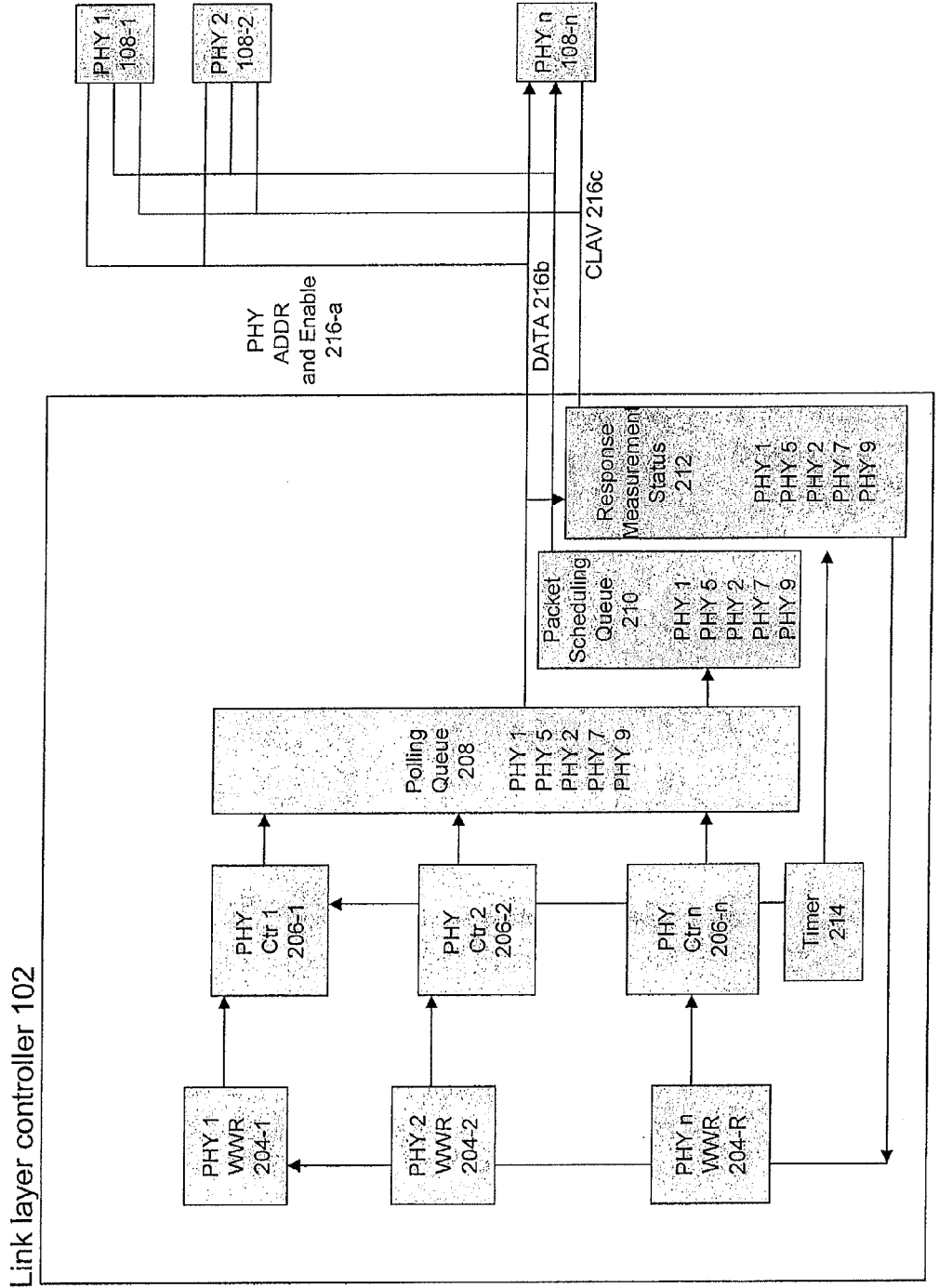
FIG. 2 is a diagram of a higher level architectural view of a master administrator.

FIG. 2 shows a more detailed view of master administrator 100, including the link layer controller 102. In link layer controller 102, a group of latency and window width registers (WWR) 204-1, 204-2 through 204-n (corresponding to PHY devices 108-1 through 108-n respectively) store a Maximum Count value (MC) and Window Width Count (WWC) indicating a polling interval for each PHY device. The MC and WWC are played in sequence, i.e., WWC is triggered immediately after MC expiration. Polling of a PHY device includes placing the address of the polled PHY device on the bus and receiving a response. By monitoring this response, the link layer controller can continually adjust the polling interval to determine an optimal polling schedule for each individual PHY device.

The latency registers pass the appropriate MC and WWC to the PHY counters 206-1, 206-2 through 206-n (again, corresponding to PHY devices 108-1 through 108-n respectively). Each PHY counter uses the MC and WWC supplied from the latency register to determine when its individual PHY device is to be polled. Once MC timer expires the control unit determines if the FFS would be issued or not and continues timing the WWC for the next polling action to determine the FCS moment.

Once a delayed polling request for a new PHY device reaches the top of the promiscuous polling queue, i.e., each device scheduled to be polled ahead of the new PHY device has been polled, polling is initiated by Polling Queue 208. To initiate polling, the address of the PHY device to be polled is transmitted on Physical Address line 216a to indicate to a PHY device that it is being polled. Once the initial signal is sent, the PHY device responds to the polling over CLAV line 216c. It should be noted that in this example, bus 106 (from FIG. 1) includes lines Physical Address line 216a, Data line 216b and CLAV line 216c. CLAV is a control signal used by the system to indicate whether the PHY device is able to receive packets, or if the device's incoming buffer is full, rendering the device unable to receive incoming packets. Response Measurement Status register 212 monitors the CLAV signals from each PHY device.

Once a CLAV signals for tFFS and tFCS are received from the PHY, the Response Measurement Status register 212 records the related times of the polling from timer 214 and determines an updated MC and WWC values. Once the PHY associated registers have the updated values, they are loaded into associated PC counter upon expiration. The PHY counter restarts its countdown to zero, starting from the updated MC then is reloaded with WWC and counts down to 0. The cycle repeats. The control system may decide to actually place the CLAV test events on the bus or in the promiscuous sampling queue based on ether events dependency like the transmission completion of another packet since last poll or when it is preempted by another PHY poll. By constantly monitoring the polling results and updating the MC, WWC values, the network administration server is better able to schedule data transfers to and from the PHY devices, since it can accurately monitor the performance (and subsequent bandwidth) of the PHY devices based upon their polling schedules.

Figure 3:
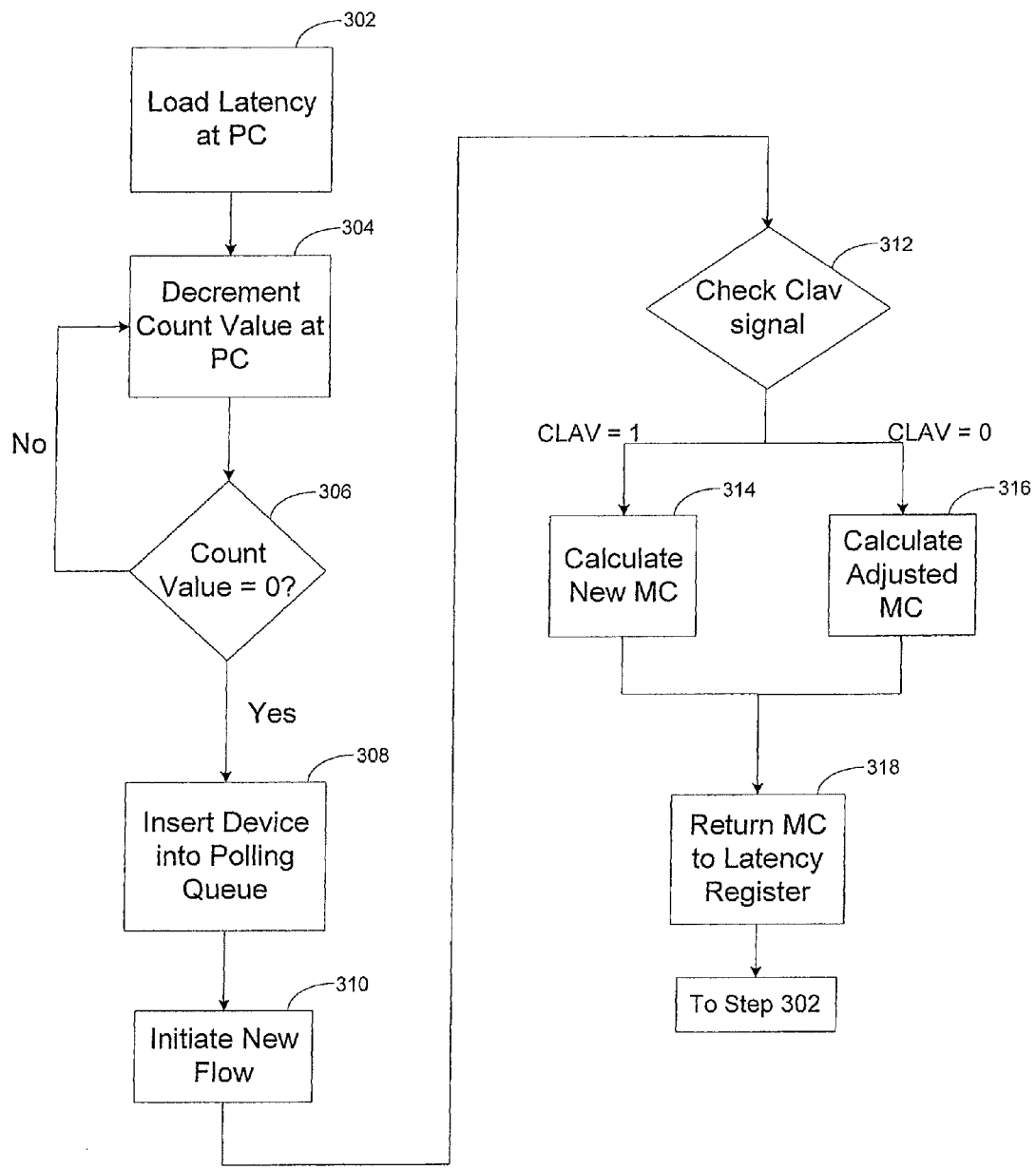
FIG. 3 is a flowchart illustrating the process followed in one embodiment of the present invention.

FIG. 3 shows a detailed flow chart following one embodiment of a polling process for an individual PHY device. In this embodiment, the polling process of PHY device 108-1 is followed.

In step 302, the PHY counter loads the MC value from the latency register. In this example, PHY counter 206-1 will load the stored MC value from latency register 204-1. If this is the first time that PHY device 108-1 will be polled, a one will be loaded from the latency register indicating that one PHY cycle later PHY device 108-1 will be placed in the polling queue. Once the PHY counter loads the MC value from the latency register, the process continues to step 304.

At step 304, the PHY counter decrements the loaded MC value by one after each polling cycle. In present invention, polling cycles are not specific to any individual PITY device, but rather a polling cycle is anytime a PHY device attached to the network administration server is polled. After decrementing the stored MC value, the PHY counter checks the updated value at step 306. If the updated count value is not equal to zero, the process returns to step 304 where the count value is again decremented. This loop will continue until the count value at the PHY counter is equal to zero. In the present example, the MC value for PHY device 108-1 was initially one, indicating that after one polling cycle the PHY counter will decrement the MC value to zero.

When the count value at the PHY counter is equal to zero, the process continues to step 308. Here, the PHY counter places the address of the PHY device to be polled into the polling queue. In this example, PHY counter 206-1 places the network address of PHY device 108-1 either onto the bus or into polling queue 208 if pre-empted by another device being polled. If the address is inserted into the polling queue, the PHY device will be scanned at the earliest possible cycle.

Once the address of PHY device 108-1 reaches the top of the polling queue, the process proceeds to step 310. Here, a new flow begins indicating a new polling process. To initiate the polling process, Polling Queue 208 places the address of PHY device 108-1 on Physical Address line 216a. This indicates to each of the PHY devices (108-1 through 108-n) that PHY device 108-1 is next to be polled. Polling Queue 208 also sends a signal to Response Measurement Status register 212 to being monitoring CLAV line 216c for a response from PHY device 108-1.

Once the Response Measurement Status register 212 has received an indication from the polling queue that PHY device 108-1 is being polled, the process proceeds to step 312. Here, the Response Measurement Status register monitors the CLAV line 216c for a response from PHY device 108-1. Once PHY device 108-1 receives its address on Physical Address line 216a, it responds by either setting CLAV to a one or to a zero. Once the Response Measurement Status register 212 receives a signal, the process splits into one of two possibilities, depending on the response. A one on CLAV line 216c indicates a positive polling response from PHY device 108-1. Conversely, a zero on CLAV line 216c indicates a negative polling response from PHY device 108-1 (i.e., the incoming packet buffer of the PHY device was full and the device was unable to accept any additional packets). If the CLAV signal is one, the process proceeds to step 314.

Once the process proceeds to step 314, PHY device 108-1 is removed from the polling queue and an updated MC value is calculated. The updated MC value is a function of the previous MC value and the previous CLAV response for PHY device 108-1.

Once the updated MC value is determined from polling that bypassed the promiscuous queue (whether the CLAV signal equaled zero or one), the process proceeds to step 318. At step 318, the updated MC value is passed to the latency register 204-1. Once latency register 204-1 has the updated MC value, the process returns to step 302 and the entire process repeats. By repeating the process multiple times, a schedule can be determined that optimizes the polling process to avoid missing times when an individual device has available incoming buffer space.

Figure 4:
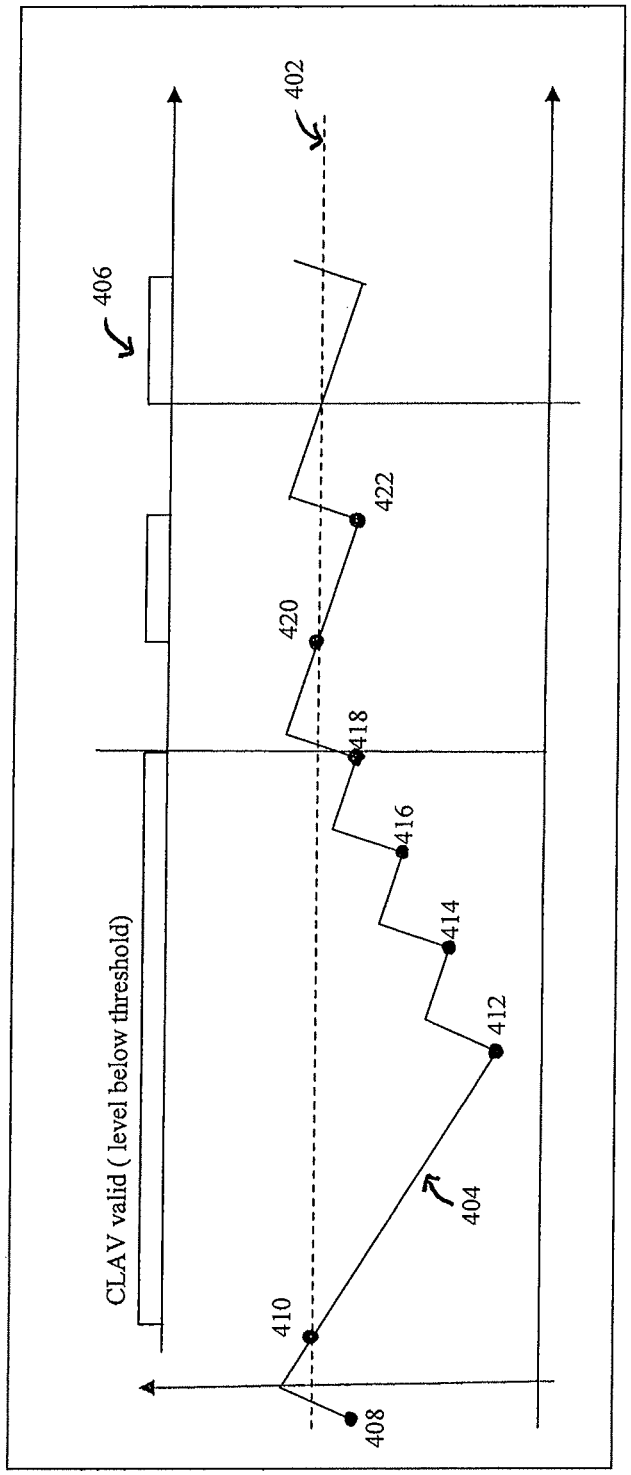
FIG. 4 is a timing diagram showing the operation of the present invention according to the embodiment of the present invention illustrated in FIG. 2 and the process described in FIG. 3.

FIG. 4 illustrates a timing diagram of the process described in FIG. 3. The horizontal dotted line 402 indicates the level at which the incoming packet buffer fills, resulting in a CLAV signal of zero from a polled device. Line 404 (the sawtoothed shaped line) indicates the current level of the incoming packet buffer of a PHY device being polled. Signal 406 indicates the current level of the CLAV signal, either one or zero.

At point 408, PHY device 108-1 is first polled. During this polling, the incoming packet buffer reaches the point where the CLAV signal is set to zero. At point 410, PHY device 108-1 is polled again. Here, the CLAV signal is set to zero, indicating a failed polling attempt. After the failed attempt, PHY device 108-1 is placed again into the polling queue as discussed above with respect to FIG. 3. Between points 410 and 412, PHY device 108-1 is not polled. During this time, the incoming packet buffer continues to empty as PHY device 108-1 processes the packets stored in the buffer. During this time, the CLAV signal is reset to one indicating PHY device 108-1 capable of receiving incoming packets.

At point 412, PHY device 108-1 is again polled. After this polling, the CLAV signal remains set to one resulting in PHY device 108-1 being polled again. This continues through points 414, 416 and 418. During the polling at point 418, the incoming packet buffer reaches its full point, resulting in the CLAV signal being set to zero. At point 420, PHY device 108-1 is again polled, responding with a CLAV signal set to zero indicating a failed polling attempt. As before, PHY device 108-1 is returned to the polling queue, and at point 422 the polling process repeats.

By analyzing the time between when the CLAV signal is set to zero (labeled Tn and Tn+1 on the diagram), an updated MC value is calculated. This updated MC value is indicative of the current performance level of PHY device 108-1.

It should be clear to persons familiar with the related arts that the process, procedures and/or steps of the invention described herein can be performed by a programmed computing device running software designed to cause the computing device to perform the processes, procedures and/or steps described herein. These processes, procedures and/or steps also could be performed by other forms of circuitry including, but not limited to, application-specific integrated circuits, logic circuits, and state machines.

Having thus described a particular embodiment of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for determining available bandwidth at respective ones of a plurality of physical layer (PHY) devices, the method comprising the steps of:
    polling by a controller said respective ones of said plurality of PHY devices at respective time intervals determined using respective ones of a plurality of counters corresponding to said respective ones of said plurality of PHY devices;
    receiving at said controller a series of responses from at least a given one of said plurality of PHY devices, said responses being based on available bandwidth at said given PHY device; and
    comparing said responses to determine an adjusted time interval for use in subsequent polling of said given PHY device;
    wherein said polling of said given PHY device comprises transmitting an inquiry as to a current status of an incoming packet buffer of said given PHY device;
    wherein determining a given time interval for polling of said given PHY device comprises loading the counter corresponding to said given PHY device with an initial value and transmitting the inquiry when the value of the counter corresponding to said given PHY device reaches a final value; and
    wherein the value of the counter corresponding to said given PHY device is changed responsive to polling of at least another of said plurality of PHY devices.

2. The method of claim 1, wherein said responses from said given PHY device are indicative of the current status of said incoming packet buffer.

3. The method of claim 1, wherein said adjusted time interval is an optimized time interval.

4. The method of claim 3, wherein said optimized time interval is determined based upon a current performance level of said given PHY device.

5. The method of claim 4, wherein said performance level of said given PHY device is determined from the available bandwidth at said given PHY device.

6. The method of claim 1, wherein said plurality of PHY devices share a common bus.

7. The method of claim 6, wherein the polling of the given PHY device comprises transmitting the physical address of the given PHY device on the common bus.

8. The method of claim 6, wherein the response is transmitted on a line of the common bus not used for other data.

9. The method of claim 1, wherein said plurality of PHY devices are ports for connecting nodes of a broadband network.

10. The method of claim 1, wherein the status of the buffer comprises a level of fullness of the buffer.

11. The method of claim 2, wherein the adjusted time interval is based at least in part on an interval of time between instances when the buffer is indicated as having a given status.

12. The method of claim 1, wherein the given time interval for polling of said given PHY device differs from a time interval for polling of said at least another of said plurality of PHY devices.

13. The method of claim 1, wherein transmitting the inquiry comprises the steps of:
    placing an identifier of said given PHY device on a polling queue; and
    transmitting the inquiry to said given PHY device when said identifier reaches an end of the polling queue.

14. The method of claim 1, wherein the value of the counter corresponding to said given PHY device indicates a number of polling cycles until a next polling of said given PHY device.

15. The method of claim 14, wherein each polling of any one of said plurality of PHY devices comprises at least one of said polling cycles.

16. The method of claim 14, wherein a polling cycle corresponds to polling of only one of said plurality of PHY devices.

17. The method of claim 1, wherein the value of the counter corresponding to said given PHY device is changed responsive to each polling of any of said plurality of PHY devices.

18. A system for determining available bandwidth at respective ones of a plurality of physical layer (PHY) devices comprising:
    a controller for polling said respective ones of said plurality of PHY devices at respective time intervals determined using respective ones of a plurality of counters corresponding to said respective ones of said plurality of PHY devices; and
    a response measurement unit for:
        receiving a series of responses from at least a given one of said plurality of PHY devices, said responses being based on available bandwidth at said given PHY device; and
        comparing said responses to determine an adjusted time interval for use in subsequent polling of said given PHY device;
    wherein said polling of said given PHY device comprises transmitting an inquiry as to a current status of an incoming packet buffer of said given PHY device; and
    wherein determining a given time interval for polling of said given PHY device comprises loading the counter corresponding to said given PHY device with an initial value and transmitting the inquiry when the value of the counter corresponding to said given PHY device reaches a final value; and
    wherein the value of the counter corresponding to said given PHY device is changed responsive to polling of at least another of said plurality of PHY devices.

19. The system of claim 18, wherein said responses from said given PHY device are indicative of the current status of said incoming packet buffer.

20. The system of claim 18, wherein said plurality of PHY devices share a common bus.

21. The system of claim 18, wherein said plurality of PHY devices are ports for connecting nodes of a broadband network.

22. A non-transitory computer-readable storage medium having encoded therein software which causes a computer to perform the operations of:
    polling by a controller respective ones of a plurality of physical layer (PHY) devices at respective time intervals determined using respective ones of a plurality of counters corresponding to said respective ones of said plurality of PHY devices;
    receiving at said controller a series of responses from at least a given one of said plurality of PHY devices, said responses being based on available bandwidth at said given PHY device; and
    comparing said responses to determine an adjusted time interval for use in subsequent polling of said given PHY device;
    wherein said polling of said given PHY device comprises transmitting an inquiry as to a current status of an incoming packet buffer of said given PHY device; and
    wherein determining a given time interval for polling of said given PHY device comprises loading the counter corresponding to said given PHY device with an initial value and transmitting the inquiry when the value of the counter corresponding to said given PHY device reaches a final value; and
    wherein the value of the counter corresponding to said given PHY device is changed responsive to polling of at least another of said plurality of PHY devices.

\* \* \* \* \*